June 8, 1937.  C. A. FLOOD  2,083,150
PIN TICKET MACHINE
Filed Sept. 28, 1931   13 Sheets-Sheet 1

Inventor
Carl A. Flood
by Roberts, Cushman & Woodberry
his Attys

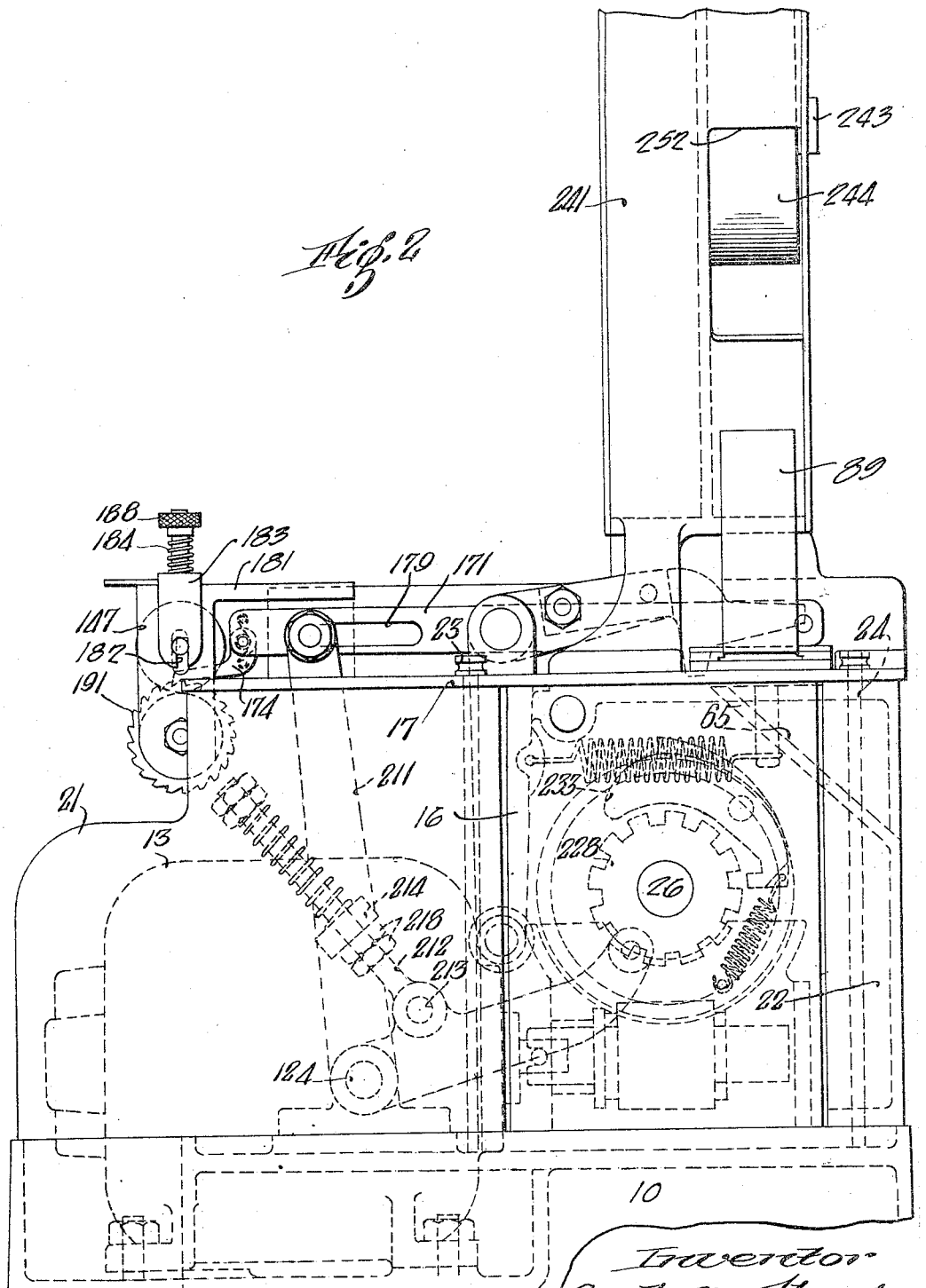

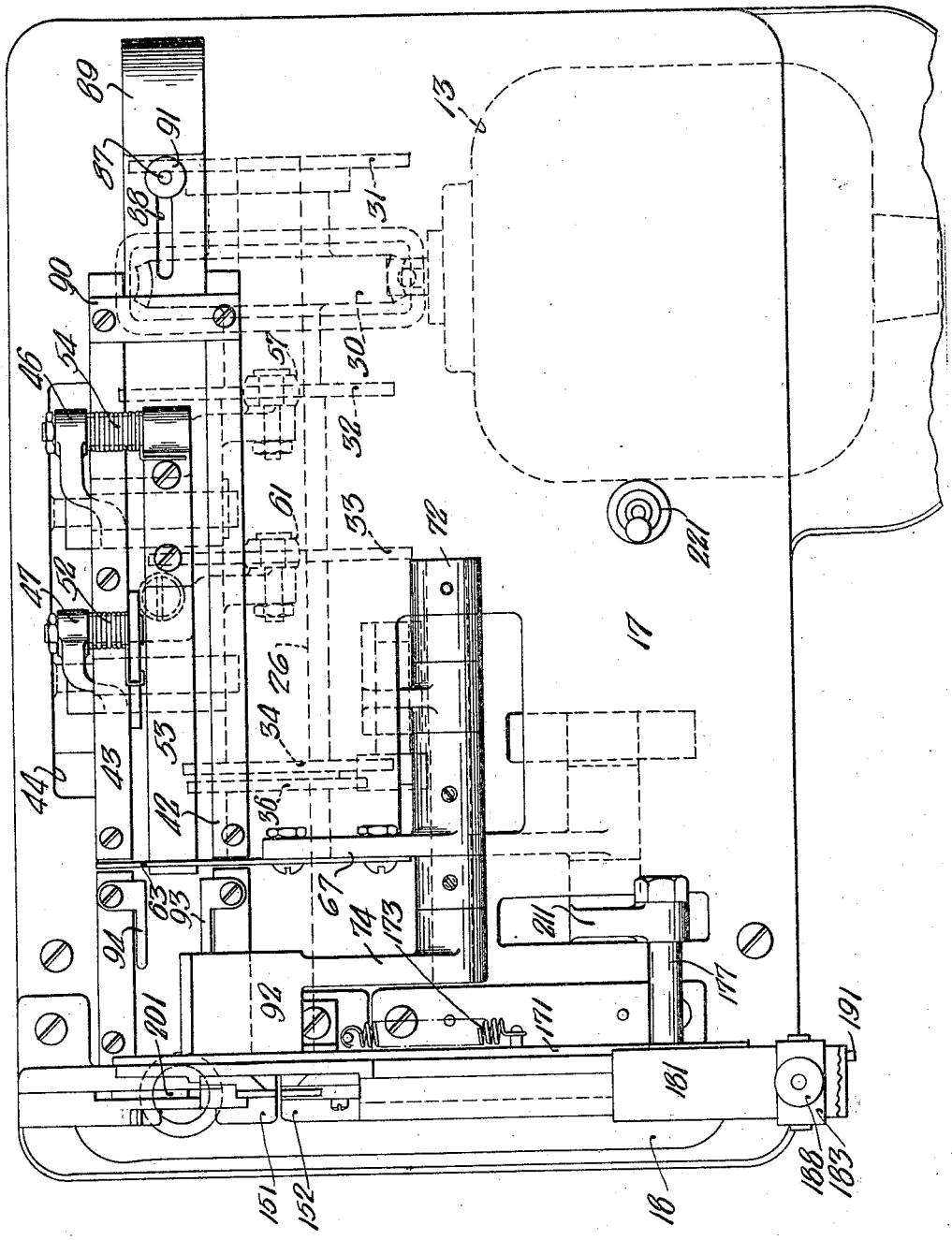

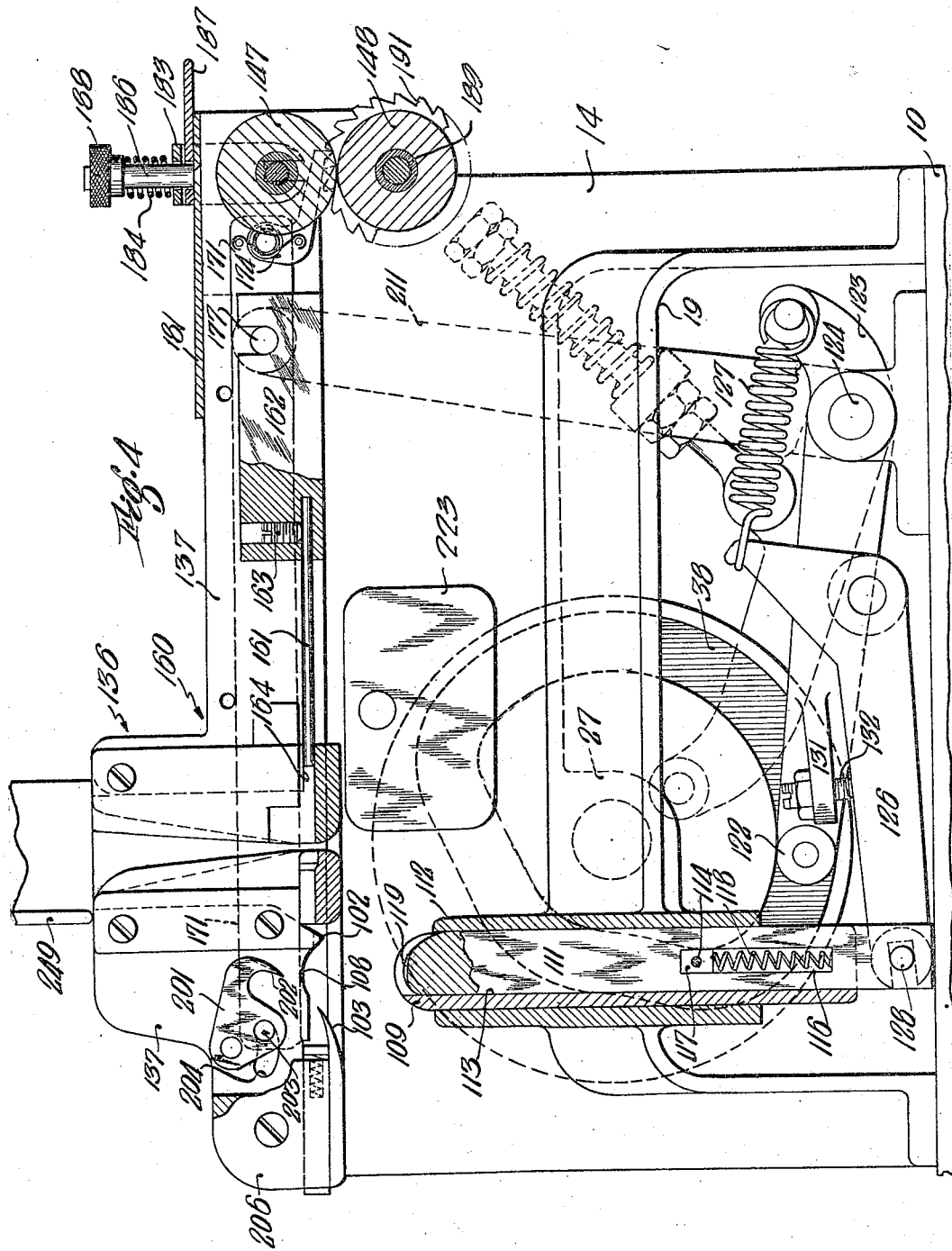

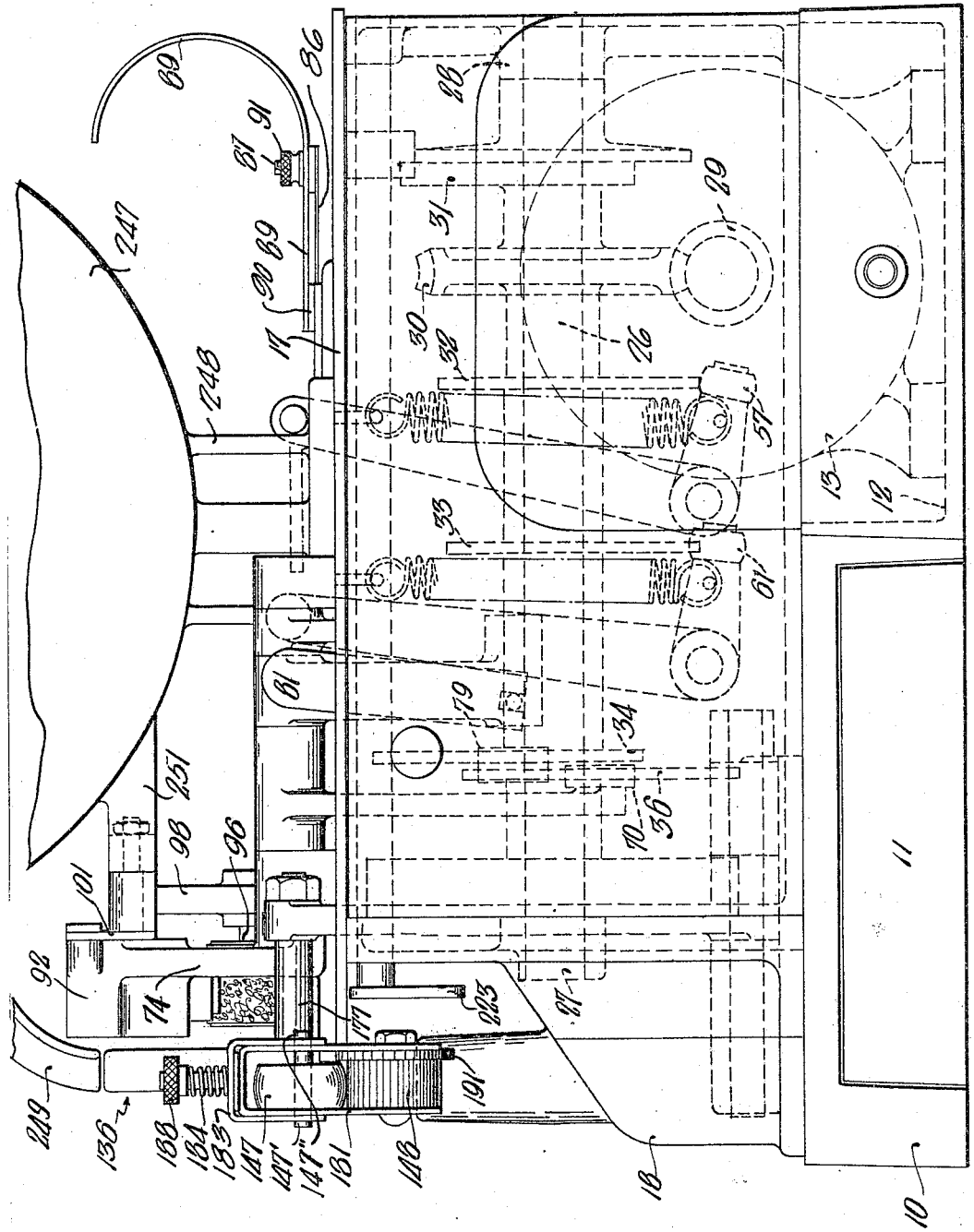

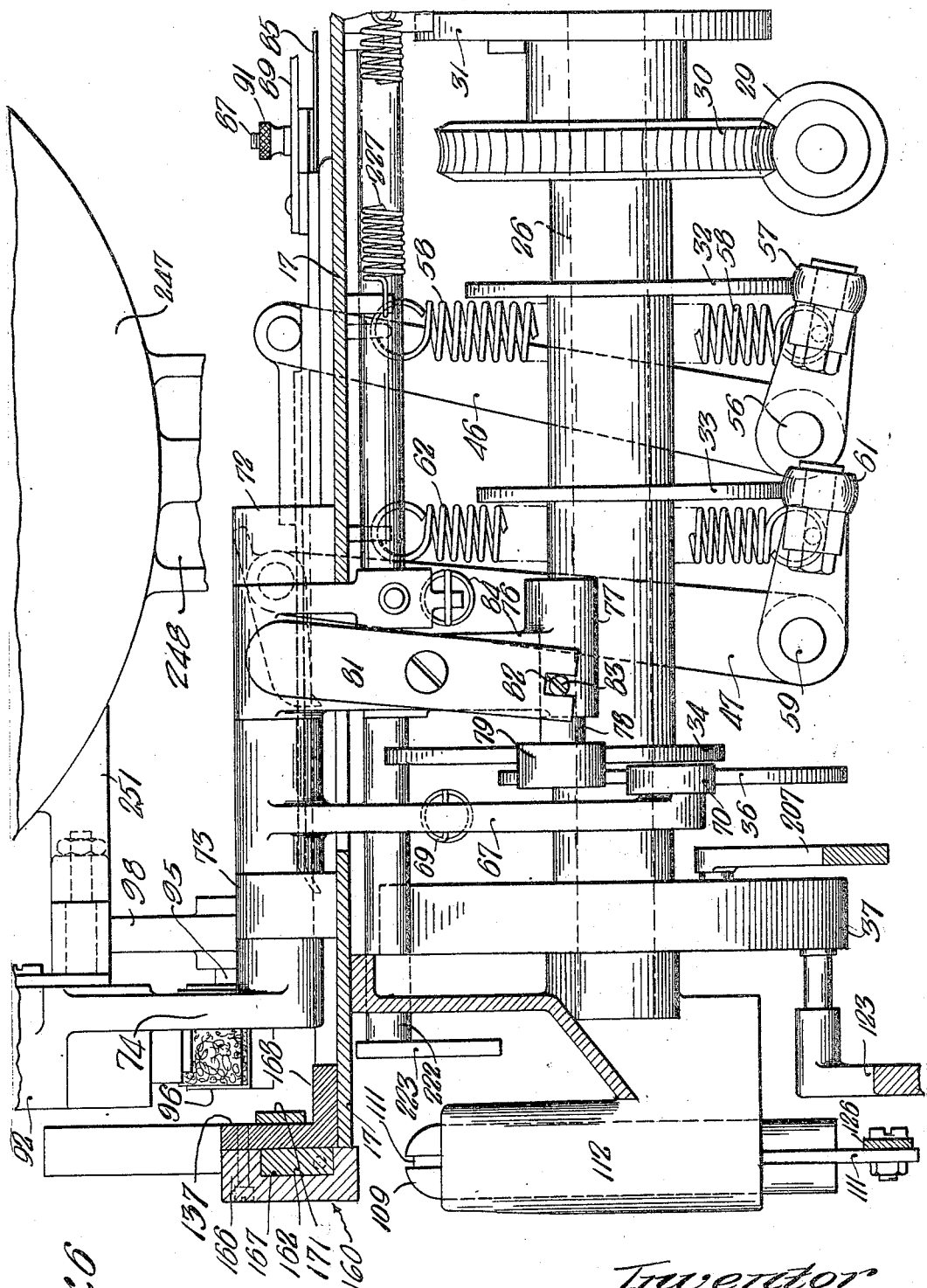

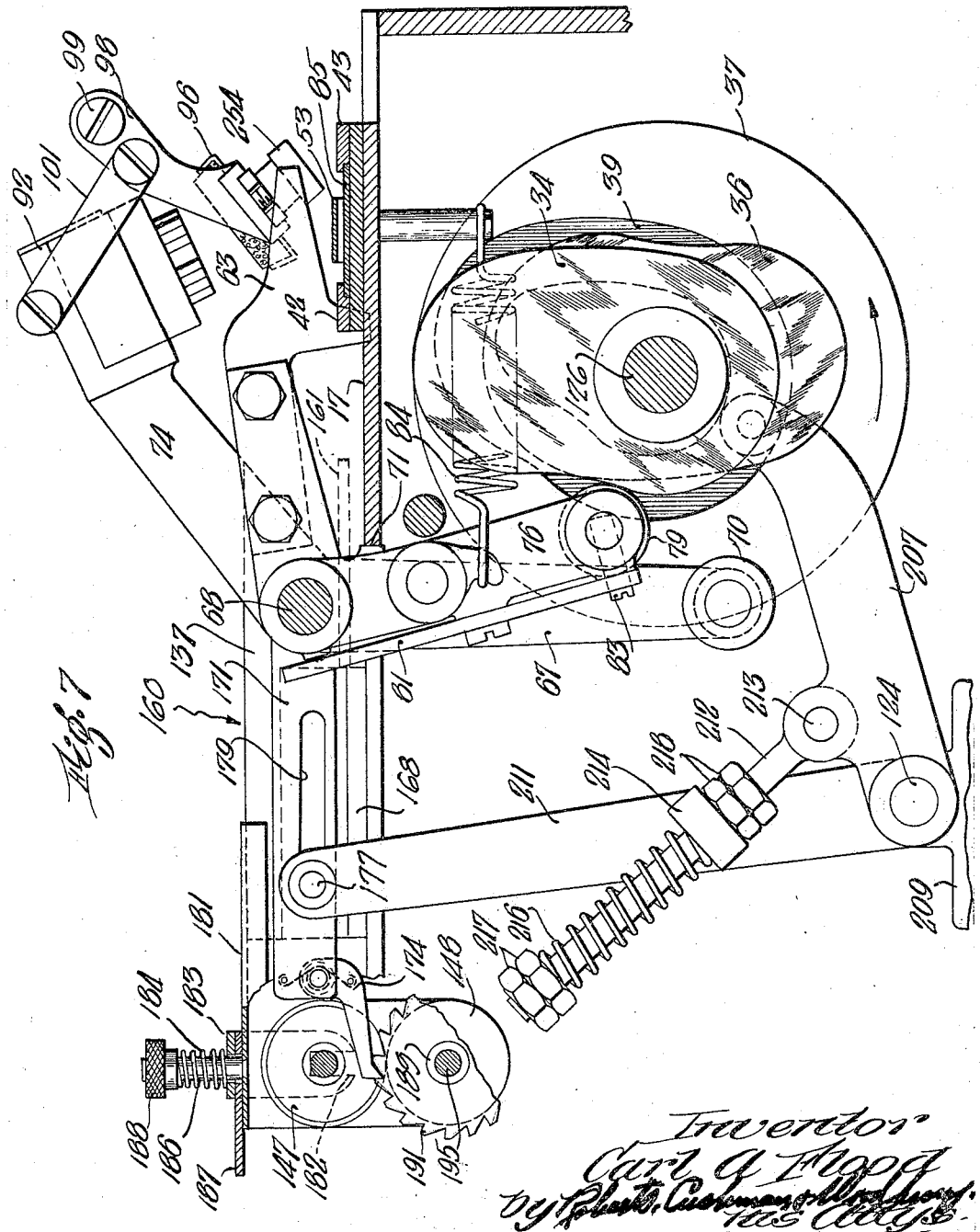

June 8, 1937.　　　C. A. FLOOD　　　2,083,150
PIN TICKET MACHINE
Filed Sept. 28, 1931　　13 Sheets-Sheet 8
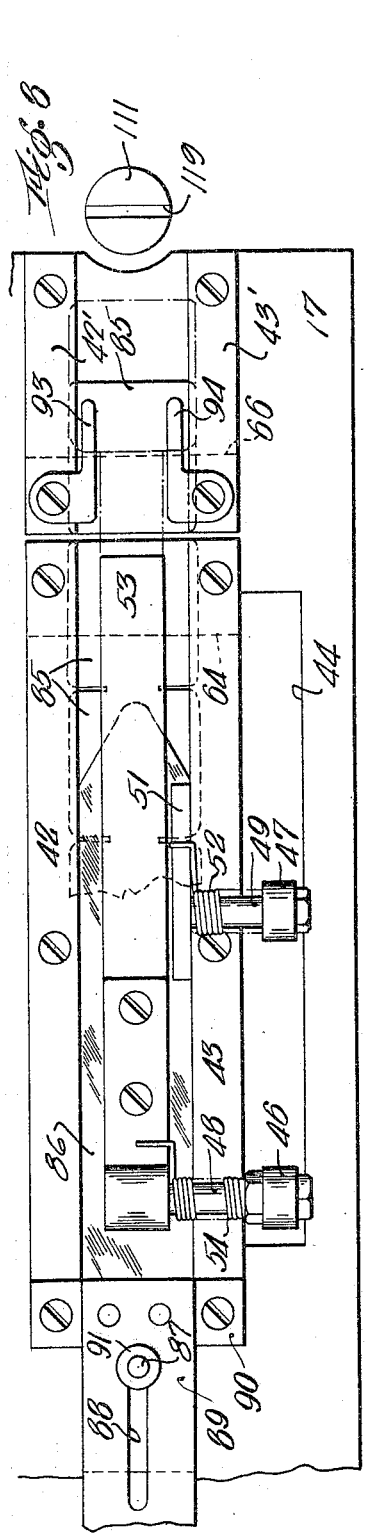

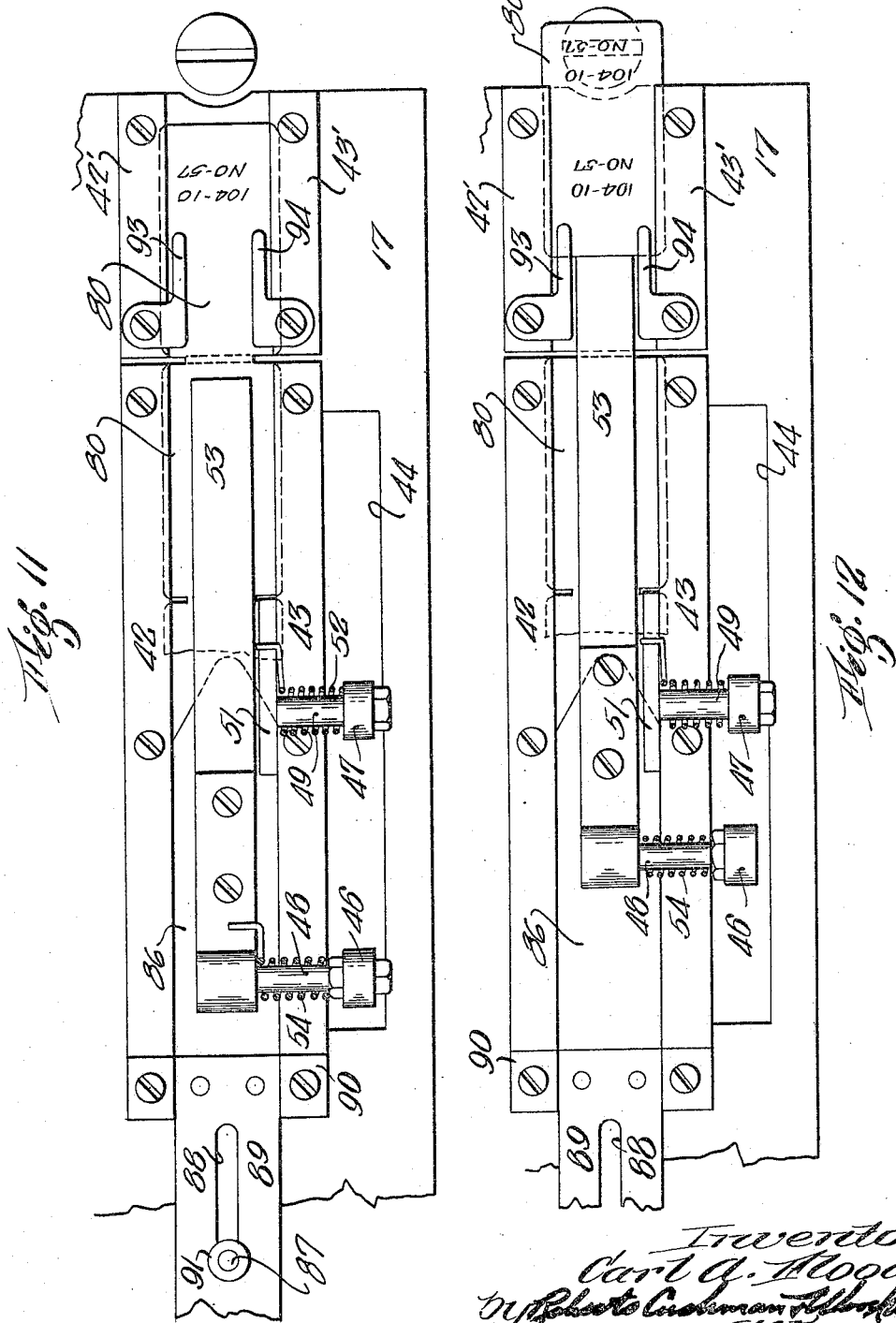

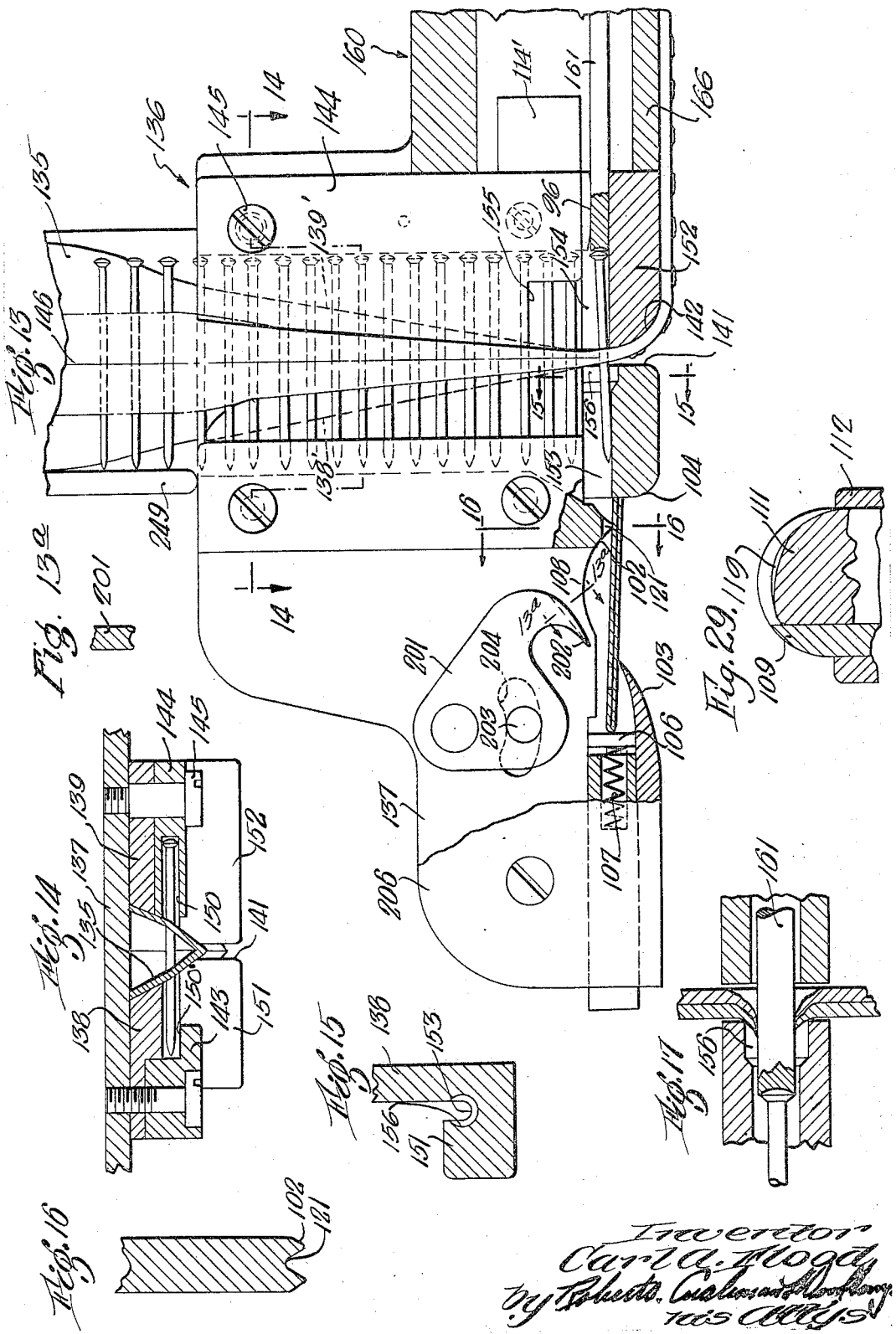

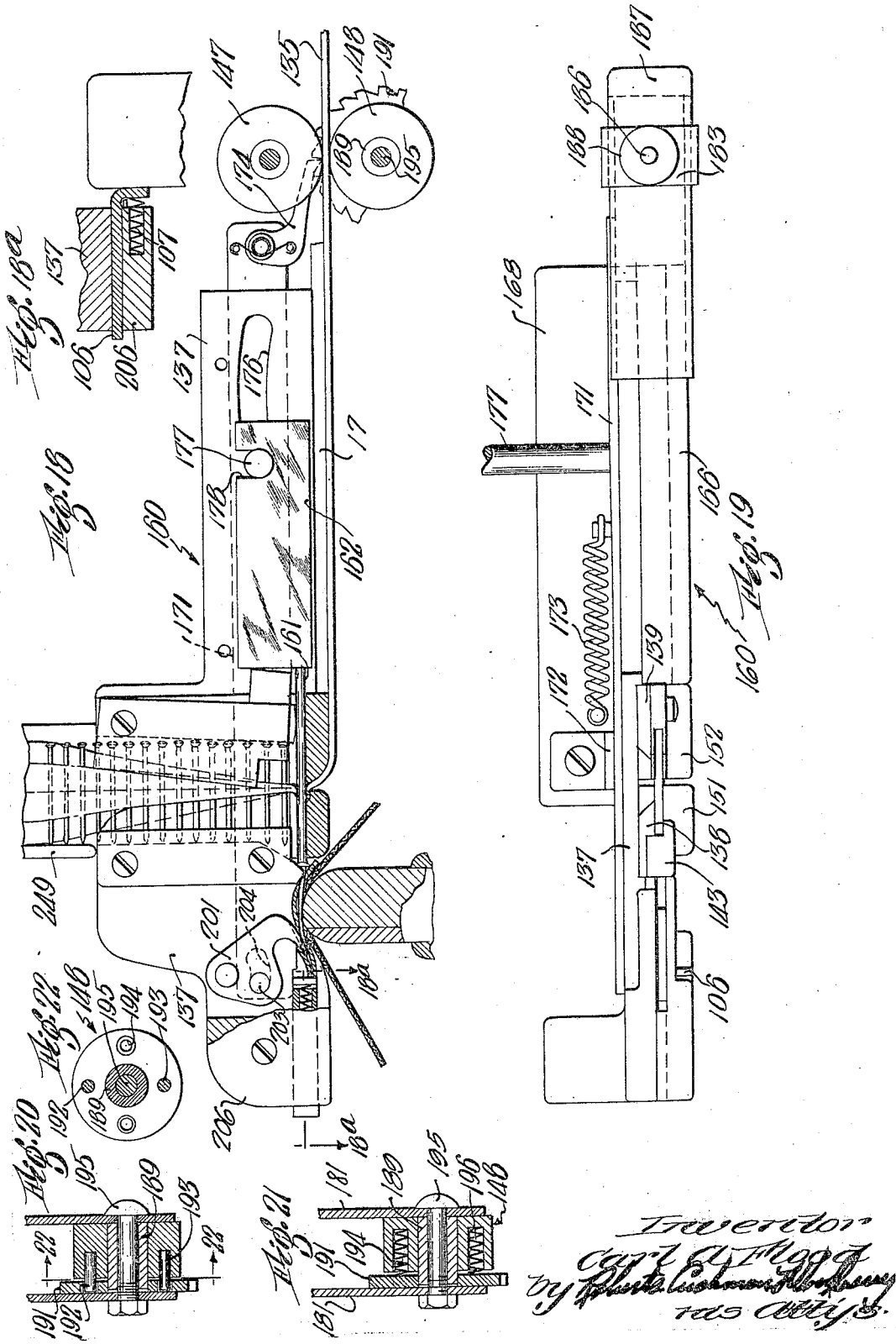

June 8, 1937.   C. A. FLOOD   2,083,150
PIN TICKET MACHINE
Filed Sept. 28, 1931   13 Sheets-Sheet 12
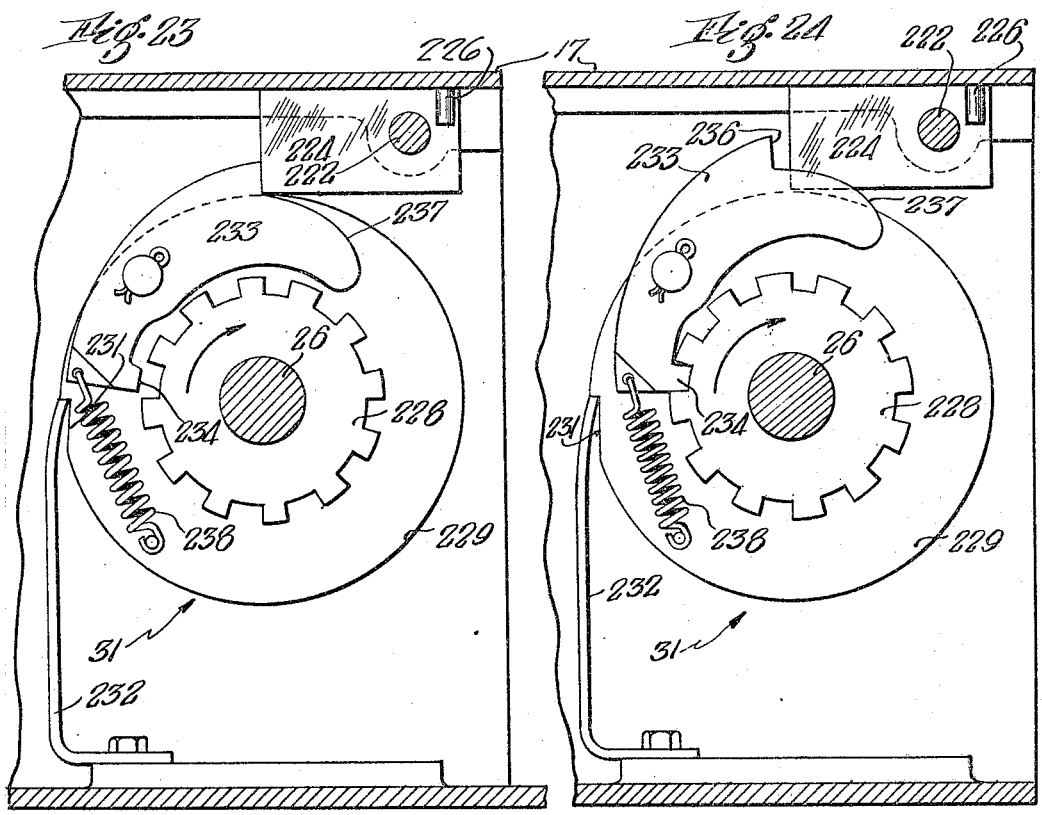
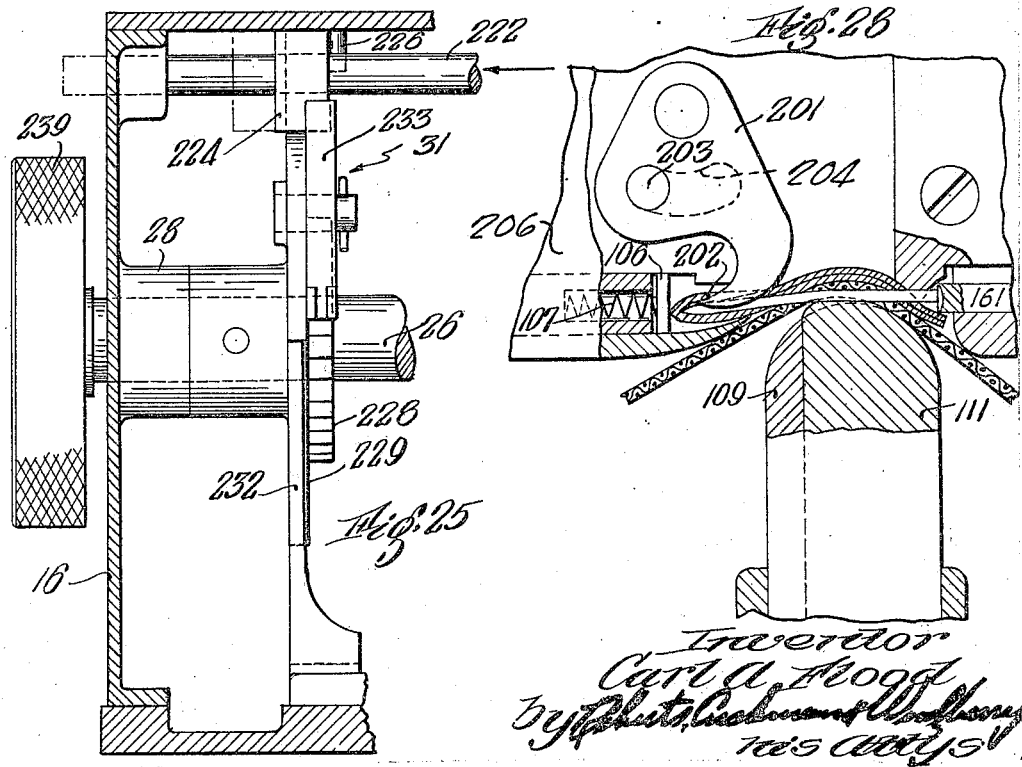

June 8, 1937.                C. A. FLOOD                2,083,150
                          PIN TICKET MACHINE
                   Filed Sept. 28, 1931      13 Sheets-Sheet 13
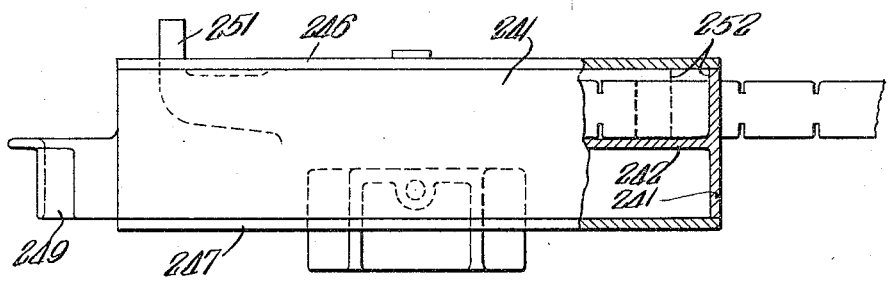
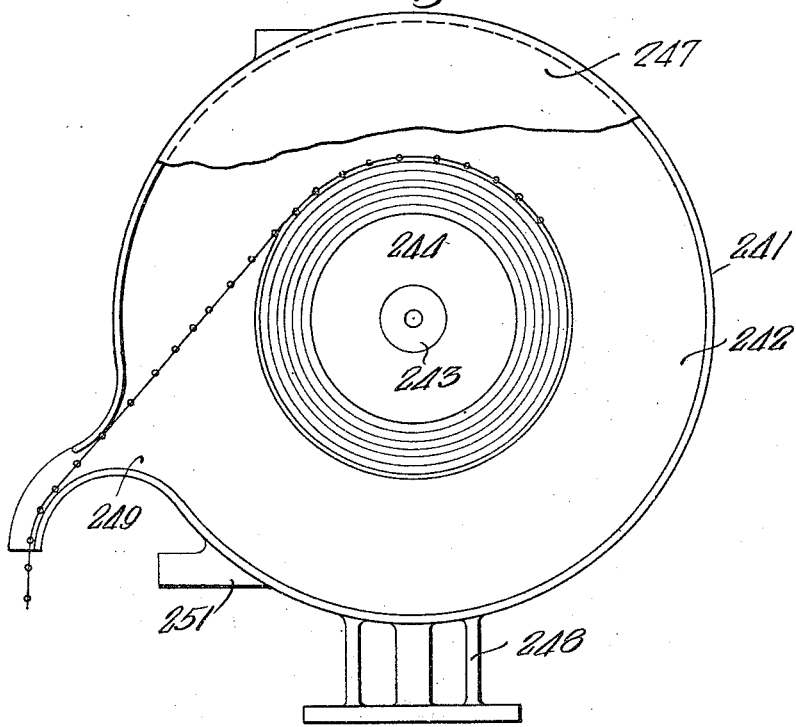

Patented June 8, 1937

2,083,150

UNITED STATES PATENT OFFICE 2,083,150

PIN TICKET MACHINE

Carl A. Flood, Framingham, Mass., assignor to Dennison Manufacturing Company, Framingham, Mass., a corporation of Massachusetts Application September 28, 1931, Serial No. 565,466

35 Claims. (Cl. 93—88)

This invention relates to the art of ticketing material, to the preparation of tickets for attachment as by printing, also to the mode of attaching tickets as well as to improved means for these purposes. The invention provides a machine comprising several devices or instrumentalities which cooperate to advance, print, sever and attach tickets and also to feed the attaching elements such as pins preferably in a strip and to transfer these pins to prepared tickets. Moreover, the various features embodied in the machine are also useful individually and may be employed advantageously for improving other apparatus of this general character.

Objects of the invention are generally to improve the construction and efficiency of apparatus of the class referred to and to simplify and improve the operations required for marking material by attaching tickets thereto; to provide for printing one or more times upon each ticket as desired and also for inking the type before each printing; to provide for visibly feeding attaching elements such as pins so that they may remain under observation during their advance substantially to a point at which such elements are transferred to a ticket; to provide for feeding a strip of pins by pulling the strip and also for carrying the strip out of the way after removal of pins therefrom; to provide for improving and simplifying the operation of removing a pin from a pin strip; to provide for operating the entire pin mechanism by a one-lever motion which includes driving a pin, guiding or directing the pin, and feeding pins in a strip substantially at least to a point from which they may be transferred to or driven into a ticket; to provide for covering the point of a pin with the ticket attached thereby; to provide for attaching tickets in this manner without substantial bending or deformation of the pin so as to facilitate removal thereof; to improve the mode of holding or clamping a ticket onto material to which it is to be attached; to provide mechanism for these purposes having an improved construction and relative arrangement of parts and which may be relatively light in weight and also readily accessible.

In the drawings:

Fig. 2 is a rear elevation of a pin ticket machine;

Fig. 3 is a plan view of a pin ticket machine;

Fig. 4 is an enlarged front elevation with parts omitted and broken away;

Fig. 5 is a side elevation of the machine;

Fig. 6 is a view corresponding to Fig. 5, showing in side elevation the operating mechanism with parts omitted and broken away;

Fig. 7 is a rear end view showing in elevation the operating mechanism illustrated in Fig. 6 with parts omitted and broken away;

Figs. 8 and 9 are top plan views of ticket feeding and guiding mechanism, showing parts in different relative positions;

Fig. 10 is a central longitudinal section through the ticket strip guiding means with the parts arranged as shown in Fig. 8;

Figs. 11 and 12 are detail plan views illustrating the relative positions of tickets at different stages in the cycle of operation;

Fig. 13 is a view in front elevation, showing to an enlarged scale the pin strip guiding means, and also portions of the ticket attaching mechanism;

Figure 1:
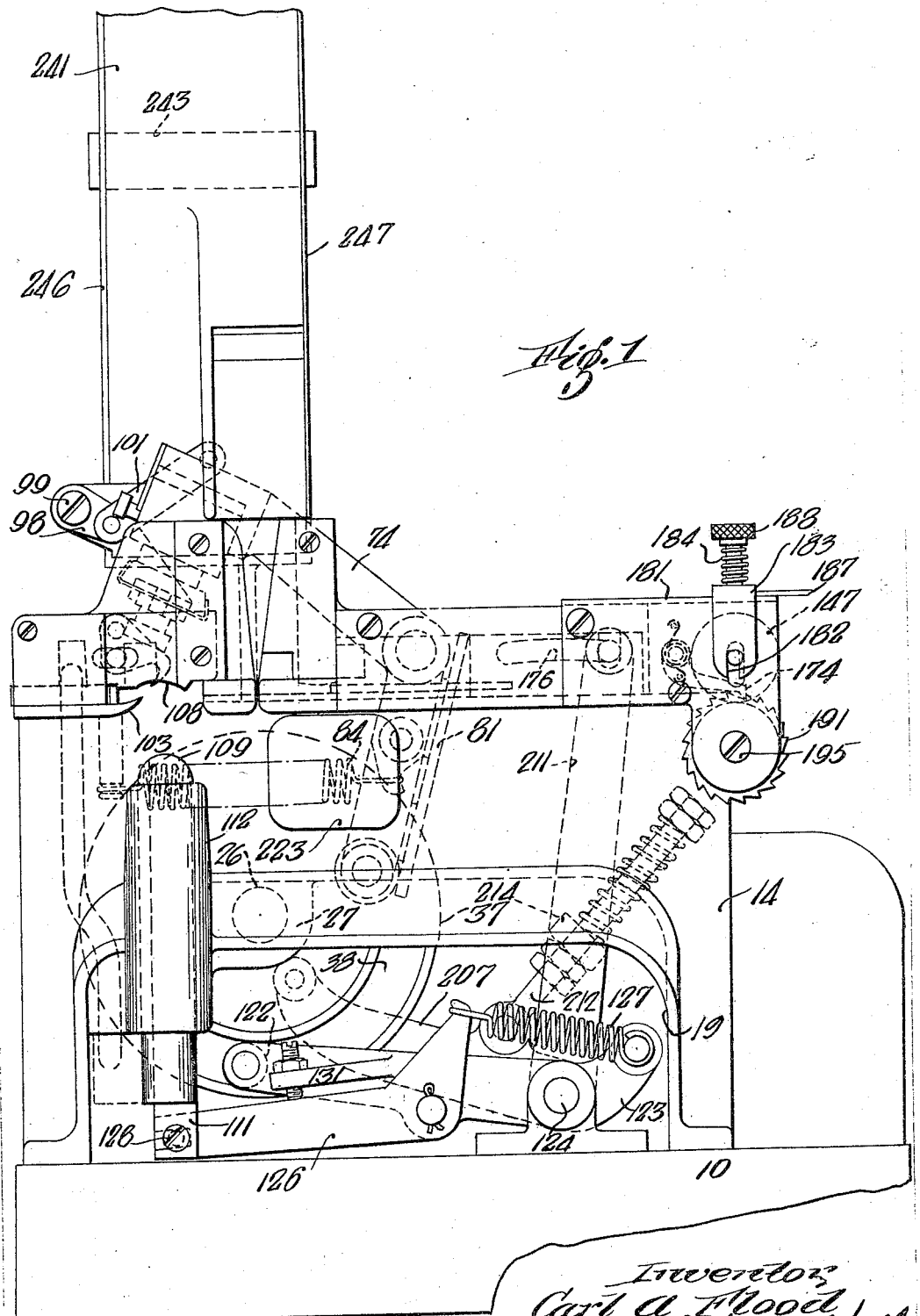
Fig. 1 is a front elevation of a pin ticket machine with the front wall of the housing removed.

Fig. 13$^a$ is a section along the line 13$^a$—13$^a$ of Fig. 13;

Fig. 14 is a section on the line 14—14 of Fig. 13;

Fig. 15 is a section on the line 15—15 of Fig. 13 with the attaching pin removed;

Fig. 16 is a section on the line 16—16 of Fig. 13;

Fig. 17 is a section taken longitudinally of the pin guiding grooves shown in Fig. 13 and illustrating the manner in which the pin driver forces a pin through the pin strip;

Fig. 18 is a view similar to Fig. 13 illustrating the parts in different relative positions and also showing the means for feeding the pin strip;

Fig. 18$^a$ is a section along the line 18$^a$—18$^a$ of Fig. 18;

Fig. 19 is a top plan view of the apparatus illustrated in Fig. 18 showing the frame for the feeding rolls in place;

Figs. 20 and 21 are different axial sections through the lower feed roll illustrated in Fig. 18;

Fig. 22 is a section on the line 22—22 of Fig. 20;

Figs. 23 and 24 are sections taken transversely of the main operating shaft and illustrating in side elevation the parts of the one-revolution clutch in different relative positions;

Fig. 25 is a section taken through the rear portion of the machine illustrating the one-revolution clutch in edge elevation;

Fig. 26 is a top plan view with parts broken away of a magazine for the tickets and the pin strip;

Fig. 27 is a view in side elevation with parts broken away of the magazine shown in Fig. 26;

Fig. 28 is an enlarged detail view illustrating a portion of the apparatus shown in Fig. 18; and Fig. 29 is a vertical section of the plunger, like Fig. 28 but showing outer part 109 in elevated position.

In the apparatus selected for illustration the operating parts are mounted within and upon a frame or housing comprising a base 10 which is of sufficient depth or thickness adjacent the front side of the machine to receive and enclose a drawer 11 (Fig. 5) for type or other accessories. The base is also provided with a depression 12 (Figs. 2 and 5) in which the driving motor 13 is mounted. Front and rear walls 14 and 16 are mounted on the base and support a top or table 17. The front wall extends entirely across the front side of the machine and is provided with a removable section or plate 18 which closes an opening 19 through which access may be had to the interior parts from this side of the machine. The rear wall preferably extends only part way across the rear side of the machine (Fig. 2) and the enclosure is completed by detachable side wall members 21 and 22 (Fig. 2). Each of these side wall members is turned inwardly at the rear of the machine to extend along the back side thereof to the end wall 16. Preferably each side wall member is mounted to pivot about a vertical axis so as to be capable of swinging outwardly and rearwardly. Thus the member 21 pivots about a vertically disposed hinge pin 23 (Fig. 2) while the member 22 pivots about a vertically disposed hinge pin 24. A cam shaft 26 is rotatably mounted in bearings 27 and 28 carried by the front and rear walls. Power is transmitted from the driving motor to the cam shaft through reduction gearing, comprising a worm 29 and a worm wheel 30, and a one-revolution clutch 31 (Figs. 5 and 6). The cam shaft has affixed thereon peripheral cams 32, 33, 34 and 36 and a double face cam 37 having grooves 38 (Fig. 4) and 39 (Fig. 7) in the opposite faces thereof.

Mechanism for feeding and for operating upon tickets is mounted upon the top or table portion 17 of the housing and comprises an open guideway (Figs. 8 to 12) formed by aligned base strips 41 and 41' and aligned marginal strips 42, 42' and 43, 43', the latter serving to confine and guide the tickets along the base strip toward the front of the machine. At one side of this guideway a slot 44 is formed in the top of the housing to receive the upwardly extending arms of bell cranks 46 and 47 (Fig. 6). At its upper end each arm carries a stub shaft 48 and 49 respectively. The stub shaft 49 carries a pivotally mounted feed pawl or finger 51 which normally is urged downwardly toward the guideway by the action of a coil spring 52. The stub shaft 48 carries a relatively long finger or pusher 53 which is likewise urged downwardly toward the guideway by the action of a coil spring 54. The bell crank 46 is mounted to pivot on a stub shaft 56 (Fig. 6) and carries on its lower arm a roller or follower 57 which is held in engagement with the peripheral cam 32 by the action of a retracting spring 58. In a similar manner the bell crank 47 is mounted to pivot on a stub shaft 59 carried by the frame, and the lower arm of this bell crank is fitted with a roller or follower 61 which is held against the cam 33 by a retracting spring 62.

At a suitable point along the ticket guideway a cutter or knife 63 is mounted to extend across the guideway from side to side and to cooperate with hardened insert strips 64 and 66 for severing the ticket from the strip. Preferably the adjacent upper edges of both of the insert strips 64 and 66 are cutting edges which cooperate with similar cutting edges of the cutter 63 so that the material between adjacent tickets will be died out as the cutter descends. Preferably the material so removed is discharged to one side of the machine through a chute 65 (Fig. 2) formed in the side wall member 22 to extend beneath the cutter. The cutter blade 63 is attached to the upper arm of a bell crank 67 (Figs. 3, 6, and 7) which is mounted to pivot about a horizontal shaft 68 as well as for rotary movement relative thereto. The lower arm of the bell crank 67 carries a follower 70 which is engageable with cam 36 and which normally is urged toward the cam by a retracting spring 69, but this movement is limited as the cam recedes by a stop or abutment 71 (Fig. 7) which engages the end of a slot in the table 17 through which the bell crank operates and thus limits upward movement of the cutting blade.

The horizontal shaft 68 on which the cutter mechanism is mounted for relative rotary movement is also rotatably supported in bearings 72 and 73 carried by the table portion 17. This shaft 68 functions as a pivot pin for a bell crank comprising a printing arm 74 extending upwardly above the machine and a depending arm 76 having at its lower end a boss 77 which slidably receives a pin 78 carrying a follower roller 79 (Fig. 6). The depending arm 76 also has pivotally mounted thereon a lever 81 extending through the table portion to be operable from the upper side of the machine and having a slot 82 in its lower end which receives and slidably engages a pin or set screw 83 carried by the sliding pin 78 on which the follower roller 79 is mounted. When the lever is thrown to the right, as viewed in Fig. 6, the follower is spaced to engage the cam 34 and also the cam 36, but when the upper end of the lever 81 is thrown to the left, the lower end, through its connection with the follower, causes the latter to be displaced to the right so that the follower roller is in position to be engaged only by cam 34. Thus, it will be apparent that by shifting the lever 81 the printing arm 74 may be made responsive to the action of one or both of the cams 34 and 36, the follower in each instance being held against one of the cams at all times by the action of a retracting spring 84 (Fig. 7) connected to the lower arm of the bell crank.

The mechanism for feeding and operating upon the ticket strip as thus far described preferably is arranged to provide for feeding tickets of different sizes, as long and short tickets, and printing data once on each ticket or in duplicate on long tickets. Thus, the feed pawl 51 is reciprocated through a sufficient stroke longitudinally of the guideway to be capable of feeding relatively long tickets 80 (Figs. 11 and 12), but when shorter tickets are used the latter are advanced by the pawl 51 during a part of the full stroke thereof. The tickets are tensioned or restrained from moving too freely along the guideway by a flat strip 86 which extends longitudinally above the guideway and bears downwardly upon the ticket strip disposed therein. This flat strip is also adjustable longitudinally of the guideway to cooperate with the pawl 51 when feeding short tickets. Thus when feeding the shorter tickets 85 (Figs. 8 to 10), the plate 86 is arranged to extend forwardly beneath the pusher pawl 53 to engage and lift the feed pawl 51 as the latter moves rearwardly and to permit this feed pawl to descend again into engagement with the ticket strip at the proper point to engage a ticket, preferably to engage an aperture or notch between adjacent tickets of the size being used. This strip 86 carries at its rear end an upwardly extending threaded pin 87 which is received in a longitudinal slot 88 formed in a rearwardly extending guide strip 89 carried by a bridge piece 90 attached to guide strips 42 and 43. The rear end of this guide strip curves upwardly and then forwardly for guiding a strip of tickets into the channel formed by the guide strips 42 and 43. A nut 91 threaded upon the pin 87 is provided for holding the strip 86 in the desired position of adjustment longitudinally of the guideway. The pawl 51 is adapted to move forwardly preferably substantially to the cutter blade 63 so as to advance each ticket as it is engaged by the pawl to a proper position beneath the cutter for severing from the strip. The pusher 53 is adapted to advance each ticket from substantially the position shown in Figs. 8 and 10 to the position shown in Fig. 9 at which the forward end of the pusher is disposed substantially at the front side of the machine adjacent the ticket attaching apparatus. In advancing from the position shown in Fig. 10 to that shown in Fig. 9 the pusher is caused by its actuating cam 32 to dwell as the detached ticket arrives beneath the printing head 92 in a proper position for printing (indicated in dotted lines in Fig. 8) and then after the printing operation, to continue the advance to deliver the printed ticket from the guideway 41 to the ticket attaching mechanism.

Thus it will be seen that each ticket is advanced in a progressive stroke from a position in the ticket strip where it is first engaged by the feed pawl 51 and brought beyond the cutter to a position for severing, at which time both the feed pawl and the pusher are disengaged from the ticket (Fig. 8) and the latter is held yieldably against the base of the guideway by longitudinally extending spring fingers 93 and 94. The parts are so timed that as a ticket is engaged by the retaining or holding fingers 93 and 94, both the pusher 53 and feed pawl 51 are retracted so as to approach the positions shown in Fig. 8 and the cutter is actuated by cam 36 to sever the ticket.

When only one printing is to be made upon such a ticket, the shifter arm 81 should be thrown to the left or to the opposite position from that shown in Fig. 6 so that the follower 79 will engage only the cam 34. This cam and the cam which actuates the pusher are so correlated and designed that the pusher is caused to advance the ticket and to cause the latter to dwell beneath the printing head 92 while the cam 34 causes the head to descend and make a printing impression upon the ticket during the dwell thereof, after which the ticket is advanced by the pusher to the ticket attaching mechanism. This cycle of operation is useful with either long or short tickets.

When long tickets are used, however, and it is desired to print data in duplicate on such tickets, the shifter lever 81 may be thrown to the right, as viewed in Fig. 6, in which condition the printing head 92 becomes responsive to the action of cams 34 and 36. These cams, together with the cams 32 and 33, are so correlated and designed as to cause the printing head to descend and make a printing impression on the leading or lower end of a long ticket due to the action of cam 36 while the ticket is in the position shown in Fig. 11, and just before the cutter is actuated by the cam 36. Immediately after this first printing impression is made the cutter descends, severs the ticket, and the pusher advances the ticket as before, causing the latter to dwell beneath the printing head (Fig. 12) as the second impression is made and then delivering the ticket to the attaching mechanism.

The conditions necessary for best efficiency in the operation of this apparatus are that the cutter be spaced from the printing head on one side or the other, although preferably on the side shown, at a distance to sever a long ticket when the end portion or leading end of the latter extends beneath the printing head in position for printing. It is also advantageous to sever the ticket from the strip and print the first impression thereon during the same interruption or dwell at the forward or progressive stroke of the ticket, although obviously these operations may be performed otherwise if desired. This arrangement together with the cooperating cams 34 and 36 makes it possible always to print a single impression on long or short tickets and yet, when desired, to print in duplicate on long tickets.

While these features provide a desirable mode of operation, it is also possible to obtain duplicate printing on a ticket by printing the first impression, while the ticket is in the strip before being severed and after having been advanced one-part stroke, then advancing the strip a second-part stroke for a second impression, at which position the ticket is severed and then advanced to attaching means. In this event the movable member such as the pawl 51 for feeding the ticket strip would operate in two-part strokes, while the member 53 for advancing the ticket would operate in one full stroke.

Means are provided for inking type carried by the printing head 92 before each printing impression, irrespective of whether one or more impressions are made upon each ticket. This mechanism comprises an inking pad 96 (Fig. 7) carried by the lower end of an arm 98 mounted upon a fixed shaft or pivot 99. The printing head is pivotally connected to the inking pad arm by a link 101 of such proportions as to force the inking pad against the type at the upper limit of the stroke of the printing arm. Preferably the parts are so arranged that the cams 34 and 36 by which the printing head is actuated recede far enough as the printing head approaches the upper limit of its stroke to leave this head under the influence of the retracting spring 84. Thus this spring is effective for bringing the inking pad yieldably against the type.

As a severed and printed ticket is moved forwardly out of the guideway 41 by the action of the pusher 53 as the latter moves to the position shown in Fig. 9, the ticket is received beneath a downwardly extending beak 102 (Fig. 13) and above the point of an upwardly directed cusp 103, the inner longitudinal edge of the ticket being yieldably urged against a fixed shoulder 104 by a spring-pressed member 106 which engages the opposite longitudinal edge of the ticket. Conveniently the member 106 may be substantially of L-shape with the base of the L extending horizontally to engage the ticket being urged into engagement therewith by a coil spring 107 disposed in a suitable recess in the frame.

The lower outline of the beak 102 recedes from the point thereof upwardly above the ticket along a concave curve providing a rigid abutment 108 against which the ticket may be forced for crimping during attachment. Directly below the abutment 108 and the beak 102 a two-part anvil (Figs. 4 and 13) comprising the relatively movable parts 109 and 111 is mounted for vertical reciprocatory movement in a boss 112 carried by the front wall of the housing. The part 109 of the anvil may be in the form of a cylindrical rod fitting slidably within the boss and having a slot 113 extending longitudinally therethrough. Preferably this slot is open along one side of the outer part 109 so that the inner part 111 which fits slidably within the slot may also have a bearing against the fixed inner wall of the boss 112. The two parts of this anvil may be connected for relative longitudinal movement by a yieldable connection (Fig. 4) comprising a pin 114 which is mounted in the outer member to extend transversely across the slot 113 and within a longitudinal slot 116 in the inner member. A block 117 mounted upon the pin 114 is adapted to fit the upper end of the slot 116 and also to provide a seat for a coil spring 118 which engages the lower end of the slot 116. The upper end of the outer part of this anvil is rounded off somewhat spherically so as to be complementary to the downwardly curved lower edge of the abutment 108. The upper end of the inner member 111 is formed with a groove 119 which may be inclined slightly upwardly for directing a pin as the ticket is being attached to the material. These parts preferably are so proportioned and arranged that the groove 119 aligns with an undercut groove 121 formed in the beak 102 (Figs. 13 and 16).

The anvil is moved upwardly to hold material against a ticket as the latter arrives at the position shown in Fig. 13 and crimp the ticket substantially as shown in Fig. 18 and is then withdrawn in properly timed relation by a system of levers actuated from the groove 38 of cam 37. From Fig. 4 it will be seen that a follower 122 rides in the groove 38 and actuates a bell crank 123 rotatably mounted on a pivot pin 124. Another bell crank 126 is mounted to pivot on the longer arm on bell crank 123, the shorter arms of these two bell cranks being yieldably connected by a relatively strong retracting spring 127. The longer arm of the bell crank 126 is slotted to receive a pin 128 carried by the lower end of the inner member 111 of the anvil. The longer arm of the bell crank 123 is provided with a laterally extending lug 131 in which an adjusting screw 132 is mounted to engage the bell crank 126.

During normal operation the adjusting screw is held firmly against the bell crank 126 by the action of the retracting spring 127, and as the levers are actuated by the cam the inner part of the anvil will be moved upwardly to a definite predetermined position, as shown in Fig. 18, for guiding a pin during attachment. The outer portion of the anvil is also moved upwardly toward a predetermined position for engagement with fabric or other material to which the ticket is to be attached, but due to the yieldable connection of the parts of the anvil the outer part is permitted to yield and to descend against the action of the spring 118, thereby to accommodate differences in the combined thickness of ticket and the material to which the ticket is to be attached. Furthermore, while the retracting spring 127 is sufficiently strong to move the inner part 111 to a definite and predetermined position, this spring is also designed to yield so as to permit the adjusting screw 132 to separate from the bell crank 126 in the event that the mechanism becomes jammed or otherwise inoperative so as to avoid serious damage to the apparatus. It will be evident that while this anvil is illustrated in connection with apparatus for pinning a ticket to material, it also may be used advantageously with other forms of attaching devices as, for example, with means for stapling a ticket to material.

The pins for attaching the tickets are carried by a strip 135 which is conducted downwardly into a guiding means indicated generally at 136. This guide may be formed conveniently from a back plate 137 (Fig. 14) having spaced pin strip guiding plates 138 and 139 attached thereto for engagement with the paper carrying the pins. The strip guiding plates have their adjacent edges undercut to diverge from the front or outer sides thereof to meet the back plate 137 substantially along the downwardly inclined dotted lines 138' and 139' (Fig. 13). The outer adjacent edges of these guide plates also incline downwardly toward the lower end of the guide 136 so as to form with the back plate 137 a guide passage having a cross section converging outwardly to the open and downwardly convergent slot formed by the adjacent front or outer edges of the plates 138 and 139 and merging at the lower end of the guide into a vertical slot 141 having relatively closely spaced side walls disposed substantially perpendicular to the back plate. The material forming one side of this slot is rounded smoothly, as indicated at 142, and then extends horizontally to provide a guiding surface against which the pin strip may be held after the pins have been removed therefrom. The pins are retained in the strip in aligned and spaced relation by a guide channel formed by vertically disposed pin guide strips 143 and 144 which are attached to the inner strips 138 and 139 and overlie the outer ends of the pins as the strip 135 moves downwardly. The pin guide strips 143 and 144 as well as the inner strips 138 and 139 may be rigidly mounted to remain in a fixed spaced relation, if desired, as very satisfactory results are obtained by this construction.

The pins carried by the strip due to their frictional contact at the pin-receiving apertures tend to oppose folding of the strip and require that the latter be placed under considerable tension in constructions such as that just described where the fold is formed solely by the action of the convergent passage in bringing the edges of the strip together. Excessive tension on the strip may cause rupturing thereof, especially about the lowermost pin, which may tear partially away so as to permit the strip to be pulled or advanced far enough to cause relative upward movement in the strip of the lowermost pin as this pin comes into the grooves 153 and 154, thereby bringing the next pin so close to the path of the pin driver as to interfere with proper operation. In order to avoid occurrences of this kind it is desirable to provide for pressing the marginal edges of the pin strip toward each other just before each step advance of this strip. This may be accomplished conveniently by arranging the inner lateral edges of the strip 144 to follow the contour of the pin strip and to cooperate with the edge of the strip 139 for guiding the adjacent marginal portion of the pin strip. The strip 144 is also supported for relative movement, preferably by being mounted to pivot or oscillate on a pivot screw 145. In order that movement of the strip 144 may be effected automatically in properly timed relation an abutment 144' carried by the movable strip 144 is arranged to extend into the path of the pin driving mechanism to be engaged by the latter as a pin is transferred to a ticket. The movable strip 144 has a vertical groove 150 which receives and guides the headed ends of the pins while the fixed strip 143 has an offset portion which cooperates with the plate 138 to form a similar groove 150' for receiving the pointed ends of the pins. The lower end of the strip 144 is notched or cut away on front and back sides, as indicated at 155 to provide clearance for the lower portion of the pin strip as well as a larger opening for observing the position of the pins.

While in general the pin strip 135 may be of usual construction, preferably it is formed with a weakened portion extending longitudinally between the rows of apertures in which the pins are disposed. Thus the strip may have been perforated along a longitudinal line 146 (Fig. 13) or it may have been previously folded or creased or otherwise weakened along this line so as to facilitate folding. It will be apparent that whatever means be adopted for weakening this strip, the line 146 representing the location of this weakened portion should extend midway between the longitudinal rows of pin receiving apertures so that as the strip is folded longitudinally upon itself, the two apertures in which each pin is disposed will be brought into register. A strip of this type is disclosed and claimed in my Patent No. 1,880,197, filed December 9, 1930 and granted October 4, 1932.

The strip is inserted into the guide by folding the leading end thereof and inserting this folded portion between the strip guiding members 138 and 139 and pulling it downwardly and through the slot 141 and around the curved shoulder 142 to a pair of feeding rollers 147 and 148 (Figs. 4 and 18). These feeding rollers are preferably located to one side of the machine so as to carry portions of the strip from which the pins have been removed away from the point of attachment of the tickets and out of the way of a person operating the machine. It will also be evident that as the strip is first led to the machine, the pins must either be removed from a sufficient portion of the leading end of the strip to permit the latter to extend between the feeding rollers 147 and 148 or the strip should be provided with a blank portion at its leading end of similar dimensions. It will be seen that as this weakened pin strip is moved downwardly through the converging passage formed by the strip guiding members 138 and 139, the longitudinal edges of the strip will be brought together, thus folding the strip longitudinally upon itself along the weakened portion 146 and bringing the apertures in which each pin is disposed substantially into alignment.

Each of the strip guides 138 and 139 has formed on the lower end thereof an outwardly disposed ledge or shoulder (151, 152) which extends across the path of pins carried by the strip for intercepting such pins as the strip descends or advances through the guide. Preferably aligned grooves 153 and 154 are formed in the upper sides of these shoulders at the proper elevation to receive an advancing pin and to support and guide the latter while it is being inserted into a ticket. Thus the groove 153 is aligned with the groove 121 formed in the under side of beak 102.

As each pin is delivered into the grooves 153 and 154 it may be removed from the folded strip by being forced therethrough in a direction normal to the plane of the folded portions of the strip. When removal is effected in this manner, the only resistance offered by the strip is that which opposes movement of the head of the pin. This is reduced to a minimum when the strip is supported or backed up around the shank of the pin so as to prevent the head from tearing large holes in the strip. However, if the backing or support for the strip provides too small a clearance for the head of the pin, the head will shear or punch out and carry with it an annular ring of paper as it passes through the pin strip. To avoid this undesirable result the groove 153 may be enlarged, as by being counterbored for a short distance from the slot 141, as indicated at 156, the counterbore preferably tapering off and merging smoothly into the groove, as shown. This construction avoids excessive rupture of the strip and the disadvantages resulting therefrom and yet provides practically all the desirable features of a direct shearing action. While in some cases it may be preferred to back up the strip entirely around the shank of the pin, this is not necessary, for good results are obtained when the groove 153 is open along the upper side, as shown in the drawings.

The mechanism for transferring a pin from the pin strip into a ticket for attaching the latter to material is mounted in a frame, indicated generally at 160 (Figs. 4, 6, 7, 13, 18 and 19), and supported on a portion of the top or table 17 of the housing which extends forwardly beyond the front wall of the housing. The strip guiding means 136 is carried by this frame, the back plate 137 being extended to form the back vertical wall of the frame and serves for supporting and guiding moving parts. A pin driver rod 161 is fixedly secured in the desired position of longitudinal adjustment in a bore in the driver head 162 by means of a set screw 163. The pin driver rod is supported and guided in a pin driver hole 164 in the guide 136 for movement through the grooves 153 and 154. The driver head 162 is mounted to slide along a passage provided by a slot 167 in an elongate guide block 166 which is attached to the adjacent portion of plate 137 (Fig. 6), the latter being provided with a flange 168 extending along the rear side thereof by which it is attached to the table 17. The rear vertical wall of the back plate 137 provides a continuous guiding surface for a bar 171 (Figs. 6, 7 and 19). While this bar has a combined sliding and rocking motion it is hereinafter referred to as a slide bar or merely a bar. An upstanding bracket 172 (Fig. 19) is arranged in opposed relation to the aforementioned vertical surface and cooperates therewith for guiding the slide bar. This slide bar normally is urged toward the ticket attaching mechanism by a retracting spring 173. The slide bar also normally extends beyond the guide 166 and carries a pivotally mounted spring pressed feed pawl 174 (Fig. 7) which cooperates with the strip feeding mechanism. The back plate 137 has an arcuate longitudinal slot 176 (Fig. 18) through which a driving connection or pin 177 may operate freely for imparting the desired stroke or reciprocatory motion to the driver head 162. This driving pin fits snugly in a recess or notch 178 formed in the driver head and also extends through a slot 179 (Fig. 7) in the slide bar. This latter slot, which may be arcuate or straight, as shown, is shorter in length than the normal full stroke of the driving connection or pin 177 so that during each such stroke the slide bar is moved as the driving connection engages the ends of the slot 179.

The pin strip is fed through the guiding means 136 and held continually under tension therein by the upper and lower feed rollers 147 and 148 which are rotatably mounted in and between front and rear depending arms of an auxiliary frame 181 (Figs. 1 to 5) mounted upon the guide 166 and back plate 137. The upper roller is provided with journals 147' and 147'' (Fig. 5) which are mounted for vertical movement toward and from the lower roller in vertical slots 182 formed in the arms of this frame while the lower roller is mounted for rotation about a fixed axis. A U-shaped brace member or yoke 183 embraces the upper portion of the frame and has the lower ends of its depending arms slotted to receive and bear against the journals of the upper roller.

A compression spring 184 is mounted upon a rod 186 affixed to the top portion of the frame 181 and extends freely through an aperture in the top portion of member 183 (Fig. 4). A flat strip or thumb piece 187 is interposed between the top crosspiece of member 183 and the top portion of the frame 181 and has an aperture through which the rod 184 loosely extends. The spring 184 seats on the yoke 183 and is held under the desired compression by a thumb nut 188 threaded on the upper end of rod 186. It will be seen that the spring 186 acts through the yoke member yieldably to urge the journals of the upper roller downwardly and thus to produce a yieldable tension on the portion of the pin strip extending between these rollers, movement for this purpose being provided by the slots 182 and 182' which receive the journals of the upper roller. This tension may be relieved temporarily by raising the thumb piece 187 so as to raise the yoke against the action of the spring.

The lower roller is provided with a central bushing 189 which extends beyond the side of the roller to provide a bearing for a ratchet wheel 191. This roller also carries fixed projections or pins 192 and 193 which engage complementary recesses in the ratchet wheel with sufficient freedom to afford relative axial movement between these parts and yet provide a rigid driving connection between the ratchet wheel and the roller. The ratchet wheel and this lower roller are normally urged apart and into engagement with the embracing arms of the auxiliary frame 181 by the action of coil springs 194 and 196 which are carried in axial recesses in the roller and engage the adjacent surface of the ratchet wheel. The action of these springs is such as to provide a side or end tension between the frame and the roller 194 and the ratchet wheel. It will be apparent that this side tension may be adjusted by tightening or loosening the pivot bolt 195. This roller is actuated from the slide bar 171 due to the action of pawl 174 which engages the ratchet as the slide bar is reciprocated. Preferably the surface of at least one of the feed rollers, as that of the lower roller, is formed with transverse ridges or corrugations or is otherwise roughened to assure good adhesion and definite and positive feeding of the pin strip as well as for holding the latter under some tension while at rest, each step advance of the rollers tending to feed the strip slightly more than the distance between pins and the rollers slipping slightly on the strip when the foremost pin seats on the ledges 151 and 152 (Figs. 13 and 14).

Means for opening or spreading plies of the ticket to receive the point of the pin as the latter is inserted may be supported by the back plate 137 which may be extended for this purpose to the left of the strip guiding means, as viewed in Figs. 4 and 13, preferably substantially to the side of the machine. On the forward side of this back plate a lever 201 is pivotally mounted and has its lower end turned downwardly in the form of a relatively sharp, flat and spear-like hook 202. This lever is widened at its upper portion and carries a driving connection or pin 203 which extends rearwardly through an arcuate slot 204 in the back plate 137. This driving connection or pin may be fixedly attached to the adjacent end of the slide bar 171, and the slot 204 may be so positioned and proportioned as to permit the lever 201 to move downwardly each time the slide bar moves to the left to the extreme end of its stroke, as viewed in Fig. 18, and then as the slide bar returns to the right to the extreme end of its stroke in this direction, the lever 201 will be moved upwardly so as to withdraw the pointed lower end thereof above the lower edge of plate 137. Preferably this lever operates in a slot formed in a cover plate 206 which is attached to the plate 137. It will also be evident that if desired the strip 143 of the guiding means may be formed integral with this cover plate and that the tension member 106 may operate in a similar slot in the inner side of the cover plate, which also provides the recess for the spring 107 engaging the tension member 106.

The mechanism for operating the pin driver rod 161 and for operating the lever 201 to spread the plies of a ticket to receive and to enclose the point of a pin as well as for operating the upper and lower feeding rollers 147 and 148 is all actuated in properly timed relation with a one-lever motion. This motion is produced by the groove 39 in the cam 37 which actuates a follower carried by a lever 207 (Fig. 7) which is mounted to pivot on the pin 124 (see also Fig. 4), the latter being rotatably supported in a bracket 209 mounted on the base of the machine. Another lever 211 is also mounted on the pin 124, these two levers being capable of relative rotary movement about the pivotal axis provided by the pin. The lever 211 carries at its upper end the driving connection or pin 177 (Fig. 4) which operates the driver head 162 and also the slide bar 171. These levers 207 and 211 are connected by a yieldable connection comprising an eye or swing bolt 212 mounted to pivot on a pin 213 carried by the lever 207. This bolt extends through a boss or lug 214 on lever 211 and carries a compression spring 216 which seats against the boss and is held under the desired tension by lock nuts 217. The bolt also carries lock nuts 218 which constitute a fixed abutment for engaging the boss 214 to move the pin driver to the left, as viewed in Fig. 7, or to withdraw the pin driver rod. The spring 216 is held under sufficient tension so that during normal operation the levers 207 and 211 operate as a bell crank and the swing bolt 212 constitutes merely a substantially rigid connection between the levers. However, in the event that the apparatus should not function properly or a pin should become jammed, or for some other reason it might be undesirable to force the pin driver or other portions of the mechanism through the normal cycle of operation, the spring 216 is adapted to yield so that although the lever 207 may continue to operate through its normal cycle, as produced by the cam 37, yet only a part of this motion need be transmitted to the lever 211.

The driving motor is controlled by a switch 221 (Fig. 3) which may be mounted upon the table portion 17 or at any other convenient location. While the motor is in operation the worm wheel 30 rotates freely about the shaft 26 (Fig. 6) except at such times as the clutch 31 operates to engage this worm wheel with the shaft. The clutch is arranged to be operated from the front side of the machine by a spring-pressed rod 222 extending beneath the table portion 17 through the front wall and carrying a thumb or finger piece or plate 223. This rod preferably is arranged to pass through the front wall of the housing at a point relatively close to the ticket attaching mechanism so that the thumb piece 223 may be engaged by an operator with a straight-in motion which may be the same movement required to insert material to be ticketed above the anvil of the ticket attaching mechanism. At the rear side of the machine (Figs. 23 to 25) above the clutch the rod 222 carries a block 224, the upper surface of which bears against the under side of table 17. This rod is normally held, by the action of a retracting spring 227, against an abutment pin 226 carried by the table.

The operating parts of the clutch comprise a ratchet wheel 228 which is freely rotatable with respect to the shaft 26 and is affixed to the hub of the worm wheel 30. A disk 229 is affixed to the shaft 26 at a point adjacent the ratchet wheel 228. This disk has a notch 231 formed in its periphery to be engaged by an upstanding resilient finger 232 to prevent counterclockwise movement of the disk and also of the shaft 26, as viewed in Figs. 23 and 24 so as to avoid rebound at stopping position. A pawl 233 is mounted to pivot on the disk outside the ratchet wheel and has a tooth 234 which is engageable between the teeth of the ratchet wheel. The other end of the pawl extends beyond the periphery of the disk 229 and is cut away to provide an abutment 236 and then recedes in a smooth curve 237 to a position below the periphery of disk 229. The pawl is normally urged into engagement with the ratchet by the action of a retracting spring 238 connected between the trailing end of the pawl and disk 229.

When the parts are arranged in the position shown in Figs. 23 and 25 the block 224 is disposed directly in the path of the abutment 236 of the pawl and thus holds the disk 229 and the shaft 26 from rotation. Inasmuch as the ratchet 228 and worm wheel 30 are freely rotatable on the shaft 26, it will be apparent that the motor may be operated continually while the parts are so arranged. However, when the rod 222 is moved rearwardly by depressing the thumb piece 223 the block 224 is moved against the action of the retracting spring 227 to a position to clear the abutment 236 so that the tooth 234 of the pawl may engage the ratchet. When this occurs there is a positive connection from the worm wheel 30 through the ratchet and pawl to the disk 229 and the shaft 26 and the latter is thereby caused to make a complete revolution. As this revolution is about completed, the block 224, having been returned to its normal position by the action of the retracting spring 227, engages the receding leading end 237 of the pawl and gradually depresses the latter so as to raise the tooth 234 out of engagement with the ratchet. As soon as this disengagement is effected the abutment 236 arrives against the block 224 and thus positively prevents further rotation of the shaft 26. It will be evident that as all of the moving parts of the machine are operated by cams carried by the shaft 26 the machine will be stopped after each complete cycle of operations unless the thumb piece 223 is held in a depressed position. The rear end of the shaft 26 also extends through the rear bearing 28 beyond the rear wall of the machine and carries a hand wheel 239 by which the machine may be operated manually or by an external source of power if desired.

The tickets to be operated upon and attached to the material are preferably in a continuous strip which conveniently may be supplied in a roll from which the tickets are fed through the machine as previously set forth herein. The pin strip 135 may also advantageously be provided in roll form. These two rolls may be carried by a magazine (Figs. 26 and 27) comprising a cylindrical wall 241 having a central vertical partition or web 242 extending diametrically therein to separate the magazine into separate compartments for the different rolls. This partition carries a centrally disposed axially extending pin 243 which extends into each of the compartments and is adapted to support apertured blocks such as the block 244 on which the rolls are mounted. Removable side plates 246 and 247 are provided for closing the respective compartments and may conveniently be releasably attached to the end portions of the pin 243 in any approved manner.

The cylindrical wall 241 is formed with or mounted upon a pedestal 248 which is secured to the top of table portion 17 of the housing (Fig. 5). At the forward side of the magazine opposite the compartment for the pin strip the cylindrical wall 241 is provided with an outwardly and downwardly curved guideway 249 which is arranged to register with the strip guiding means 136 (Figs. 1 and 13) and preferably to bear against the top edge of the back plate 137 of this strip guiding means. The forward side of the magazine is also provided with a bracket arm 251 to which the fixed pivot or stub shaft 99 (Fig. 7) of the inking arm may be attached. On the rear side of the housing opposite the compartment for the strip of tickets the cylindrical wall 241 is provided with a slot 252 through which the ticket strip passes downwardly around the upwardly curved end portion of the guide strip 89 (Figs. 5, 8 and 9).

In preparing the machine for use, a roll of tickets and the rolled pin strip are mounted in the magazine. The end of the strip of tickets is then passed through the opening 252 in the magazine downwardly around and beneath the curved rear portion of the guide strip 89 and into the ticket feeding and guiding means. Preferably the leading end of this ticket strip is advanced substantially to a position to register with the cutter slot in the guideway, although this is not necessary, for so long as the ticket strip extends in the guideway for a sufficient distance to be engaged by the feed pawl 51 (Figs. 8 and 9) the strip will be adjusted automatically to the proper position in this guideway after one cycle of operation. The pin strip is passed through the guide 249 and the forward end of the strip is folded along the weakened portion 146 with the fold edge extending outwardly. This folded portion is then inserted in the vertical slot 141 (Fig. 14) and carried around the shoulder 142 (Fig. 13) to the feeding rollers 147 and 148 (Fig. 18). By raising the thumb piece 187 (Fig. 7) the feeding rollers may be easily separated to receive the pin strip which is pulled through these rollers far enough to bring a pin into the guiding grooves 153 and 154 of the guiding means 136 (Fig. 13).

The pin strip having been pulled taut in this position, the thumb piece 187 is released and, assuming the spring 184 to be under the proper tension, the device is ready for operation.

The material to which a ticket is to be attached may be grasped on either side of the point to which the ticket is to be secured and inserted above the two-part anvil. The same motion required for an operator to insert this material above the anvil may be effective for depressing the thumb piece or plate 223 and tripping the one-revolution clutch. The various parts of the apparatus operate in properly timed relation, as previously set forth, to advance, sever and print a ticket, and finally to bring the latter to the position shown in Fig. 13. On arriving at this position the lever 201 swings downwardly causing the spearlike point 202 to enter between and separate the plies of the ticket while the latter is substantially flat, as shown in Fig. 13, and thus this point forms an opening to receive and conceal the point of a pin. The two-part anvil then moves upwardly and crimps the ticket in the manner illustrated in Fig. 18. The pin driver rod 161 moves through the guiding grooves 153 and 154 to force a pin from these grooves through the pin strip, through the groove 221 (Fig. 16), and through the crimped ticket, and the material which is held taut across the anvil in the manner illustrated in Fig. 18. As the point of the pin is advanced to pierce the ticket the second time, the lower grooved edge of the point 202 guides the point of the pin into the opening formed by the point 202. While the point of the pin is being inserted in this way the ticket is supported on its lower side by the cusp 103. The lever 201 is then moved upwardly by the slide bar so that the point 202 is withdrawn from the ticket which is removed from the machine as the next ticket is advanced to the position shown in Fig. 18.

As the pin driver mechanism advances to the position shown in Fig. 18, the block 162 engages the abutment 144' and rocks the strip 144 in a clockwise direction about its pivot. This moves the pin strip away from the guiding edge of the inner strip 139 and also forces the marginal edge of the pin strip longitudinally along the pins carried thereby. This forms a more distinct fold in the pin strip and has the effect of drawing the lateral edges thereof toward each other and away from the guiding edges of the inner guide strips 138 and 139, and in this way prepares the pin strip for the next step advance movement. It will be evident that the action of the movable strip 144 may be made sufficient to compress or preform the lateral edges of the pin strip to the form required for these edges to fit within the converging slot formed by the inner strips 138 and 139 after the next step advance of the pin strip. While this is a very simple operation it provides a clearance for the lateral edges of the pin strip during at least a portion of the step advance movement thereof and thereby reduces or eliminates the resistance which otherwise would oppose this step advance movement due to the necessity of relying upon the converging edges of the strips 138 and 139 for moving the lateral edges of the pin strip toward each other and longitudinally of the pins. As the pin driver is withdrawn the movable strip 144 swings back to the position shown in Fig. 13. Preferably the lower edge of the movable strip 144 is curved convexly as indicated at 96 to engage the pin driver rod with a light frictional contact. This relatively light engagement between these parts is sufficient to return the movable strip 144 as the pin driver rod is withdrawn.

An important advantage of this construction resides in the arrangement of the two-part anvil and the fixed abutment 108 which provides a definite location by which the operator may gauge the point to which a ticket will be attached to the material. Also the inner part 111 of the anvil is moved upwardly to a definite distance so that the groove 119 therein may align with the groove 121 and the groove 153 for guiding the pin as it passes across the under side of the ticket and through the material. The outer part of this anvil yields or recedes downwardly after engaging the material to compensate for any slight variations in the thickness of the goods being ticketed. Thus the outer portion of the anvil yieldably grips and secures the material with substantially the same pressure during attachment of each ticket. While as illustrated in Figs. 18 and 28 the pin may be flexed or bowed slightly during insertion through the ticket, the bowing action is not sufficient to produce permanent deformation of the pin. Hence after attachment the pin remains straight as before and may therefore be easily withdrawn from the ticket.

As the slide bar returns and withdraws the lever 201, it also moves the pawl 174 (Fig. 18) to the right and advances the ratchet 191 (Figs. 21 and 22) to feed the pin strip forwardly so as to bring another pin into the grooves 153 and 154. This same motion also withdraws the pin driver 161. Preferably the teeth on the ratchet and the stroke of the slide bar are so arranged as to provide a slight overfeed on the roll 148. This assures that the next pin to be inserted will be brought positively into engagement with the base of the grooves 153 and 154. This engagement of the pin with these grooves also positively arrests forward movement of the pin strip so that the feeding rollers must slip during the remaining portion of this step movement of the ratchet. It will be evident that as the slide bar 171 moves to left, the pawl will pass freely over one tooth of the ratchet and will be positioned for advancing the next pin at the proper point in the cycle.

While the apparatus of this invention is adapted to operate upon various well known types of tickets, it is preferred to provide tickets of the kind disclosed and claimed in my copending application, Serial No. 486,360, filed October 4, 1930.

It should be understood that the present disclosure is for the purpose of illustration only and that this invention includes all modifications and equivalents which fall within the scope of the appended claims.

I claim:

1. Apparatus of the class described comprising means for inserting a pin through a ticket at spaced points and through material between said spaced points, an anvil comprising a rigid part engageable with the pin between said spaced points and a part movable beyond the rigid part for engagement with the material, a yieldable connection between the rigid and the movable parts for normally urging the movable part into engagement with the material, and means for moving the anvil as a unit and for bringing the rigid part to a fixed stop for engagement with a pin.

2. Apparatus of the class described comprising means for inserting a pin through a ticket at spaced points and through material between said spaced points, an anvil comprising a rigid part engageable with the pin between said spaced points and a part movable beyond the rigid part for engagement with the material, a yieldable connection between the rigid and the movable parts for normally urging the movable part into engagement with the material, means for moving the anvil as a unit and for bringing the rigid part to a fixed stop for engagement with a pin, and means providing for yielding movement of the rigid part away from the latter position.

3. Apparatus for attaching a ticket comprising means for forcing a pin through a ticket and through material, and means for spreading the ticket between the outer plies thereof to provide an opening for receiving and enclosing the point of the pin.

4. Apparatus for attaching a ticket comprising means for forcing a pin through a ticket and through material, means for spreading the ticket between the outer plies thereof to provide an opening for receiving and enclosing the point of the pin, and means for guiding the straight point of the pin between the outer plies of the ticket.

5. Apparatus for attaching a ticket comprising means for forcing a pin through a ticket and through material, a guide for entering the ticket between the faces of the tickets for directing the point of the pin therebetween to be enclosed thereby, and means for operating the guide and the pin forcing means in timed relation.

6. Apparatus for attaching a ticket comprising means for driving a pin straight through a ticket at spaced points and through material between said spaced points, actuating means for the pin driving means, and a yieldable connection for transmitting motion from the actuating means to the pin driving means.

7. Apparatus for attaching a ticket comprising means for driving a pin substantially straight through a ticket at spaced points and through material between said spaced points, and means for inserting the straight point of the pin within the ticket.

8. Apparatus for attaching tickets comprising means for feeding pins to position for attaching a ticket, means for driving a pin through a ticket at spaced points and through material between said points, a movable guide for directing the point of a pin within the body of a ticket to be enclosed thereby, and means for actuating the aforementioned means in timed relation with a one lever motion.

9. Apparatus for attaching tickets comprising means for driving a pin through a ticket at spaced points and through material between the spaced points, means for feeding pins in a strip to bring each pin into position to be driven, a movable guide for directing the point of a pin within the body of a ticket to conceal the point, a lever for actuating the pin driving means, a bar for operating the movable guide and the feeding means, and a lost motion connection between the lever and the bar, whereby the movable guide and the feeding means may also be actuated by the lever.

10. Apparatus of the class described comprising means for feeding a strip of pins in which the pins extend transversely to the longitudinal edges thereof with each pin twice piercing the strip, means engaging that portion of the strip pierced by the pins for holding the portions of the strip pierced by the pins approximately normal to the pins as the latter approach the position from which they are to be driven for attaching a ticket, means for forcing a pin through the strip and into a ticket for attaching the latter, and means for guiding the pin into the ticket.

11. Apparatus of the class described comprising means for feeding a strip of pins in which the pins extend transversely to the longitudinal edges thereof with each pin twice piercing the strip, means engaging that portion of the strip pierced by the pins for holding the portions of the strip pierced by the pins approximately normal to the pins as the latter approach the position from which they are to be driven for attaching a ticket, means for forcing the heads of the pins through the strip without shearing the latter, and means for guiding each pin through a ticket and material to be ticketed.

12. Apparatus of the class described comprising means for feeding a strip of pins, means for folding the strip longitudinally substantially upon itself to bring the rows of pin receiving apertures substantially into register and the folded portions of the strip approximately normal to the pins, and means for pushing the pins through the strip and into a ticket for attaching the latter.

13. Apparatus of the class described comprising a convergent passage adapted to receive a strip of pins and to form a longitudinal fold in the strip as the latter advances through the passage, means for advancing the strip through the passage, and means engageable with the strip and movable transversely of the passage for assisting in forming the fold in the strip.

14. Apparatus of the class described comprising a convergent passage adapted to receive a strip of pins and to form a longitudinal fold in the strip as the latter advances through the passage, means for advancing the strip through the passage, means adjacent the convergent end of the passage for removing a pin from the folded strip, means engageable with the strip and movable transversely of the passage for assisting in forming the fold in the strip, the latter means being operable by the pin removing means.

15. Apparatus for pinning a ticket to an article comprising means for holding the ticket and article in juxtaposition, a pin-guide for insertion between the faces of the ticket, means for inserting the pin guide into the ticket, and means for inserting a pin through the ticket and article and thence against said pin-guide so that the point of the pin is guided to a position where it is enclosed between said faces of the ticket.

16. Apparatus for pinning a ticket to an article comprising means for holding the ticket and article in juxtaposition, a pointed pin-guide for insertion into the ticket, means for inserting said pin-guide obliquely into a partial thickness of the ticket, and means for inserting a pin through the ticket and article and thence against said pin-guide to direct the point of the pin back into the ticket so that the point of the pin does not project therefrom.

17. Apparatus for applying fasteners of the type employing a strip carrying a series of fasteners, comprising means for removing the foremost fastener from the strip at an applying station, a stop in the path of the foremost fastener at said station, and feed means beyond said station for pulling the strip step by step to bring successive fasteners against said stop.

18. Apparatus for applying fasteners of the type employing a strip carrying a series of fasteners, comprising means for removing the foremost fastener from the strip at an applying station, a stop in the path of the foremost fastener at said station, and yieldable means beyond said station for pulling the strip step by step to bring successive fasteners against said stop.

19. Apparatus for applying fasteners of the type employing a strip carrying a series of fasteners, comprising means for removing the foremost fastener from the strip at an applying station, a stop in the path of the foremost fastener at said station, and feed means frictionally engaging the strip beyond said station for pulling the strip step by step to bring successive fasteners against said stop, the feed means slipping on the strip when a fastener engages the stop.

20. Pinning apparatus of the type employing straight pins carried in parallel juxtaposed relationship on a strip with at least one portion of each pin outside the strip, means for removing the foremost pin from the strip at an applying station, a stop in the path of said portion of the foremost pin at said station, and feed means beyond said station for yieldingly pulling the strip step by step to bring successive pins against said stop in position to be removed by said first means.

21. Apparatus for applying pins of the type employing straight pins carried in parallel juxtaposed relationship on a strip, means for removing the foremost pin from the strip at an applying station, a guideway leading to said station, a stop in line with said guideway at said station for obstructing advance of the strip, the apparatus having an opening in line with the foremost pin when the strip is thus obstructed through which the pin may be removed from the strip by said means, and yieldable means beyond said station for pulling the strip step by step successively to bring successive pins against said stop in position to be removed by said means.

22. Apparatus for applying pins of the type employing straight pins carried in parallel juxtaposed relationship on a strip, means for removing the foremost pin from the strip at an applying station, a guideway leading to said station, a stop in line with guideway at said station for obstructing advance of the strip, the apparatus having an opening in line with the foremost pin when the strip is thus obstructed through which the pin may be removed from the strip by said means, feed means frictionally engaging the strip beyond said station for pulling the strip step by step to bring successive pins to said stop, the feed means slipping on the strip when a pin reaches the stop.

23. Apparatus for applying pins of the type employing straight pins carried in parallel juxtaposed relationship on a strip, push means for driving the foremost pin point foremost from the strip at an applying station, a guideway leading to said station, a stop in line with said guideway at said station for obstructing advance of the strip, the apparatus having an opening in line with the foremost pin when the strip is thus obstructed through which the pin may be driven from the strip by said means, and yieldable means beyond said station for pulling the strip step by step successively to bring successive pins against said stop in position to be driven by said means.

24. Apparatus for applying pins of the type employing straight pins carried in parallel juxtaposed relationship on a strip, push means at an applying station for driving the foremost pin point foremost from the strip into the material to be pinned, a guideway leading to said station, a stop in line with guideway at said station for obstructing advance of the strip, the apparatus having an opening in line with the foremost pin when the strip is thus obstructed through which the pin may be driven from the strip by said means, feed means frictionally engaging the strip beyond said station for pulling the strip step by step to bring successive pins to said stop, the feed means slipping on the strip when a pin reaches the stop.

25. Apparatus for attaching a ticket to material, comprising relatively movable members for flexing the ticket and material, means for pinning the ticket and material together while so flexed, means for feeding tickets into pinning position, and movable means acting on the margin of the ticket after the ticket reaches said position to cause the point of the pin to stop between the opposite outside faces of the ticket.

26. Apparatus for attaching a ticket to material, comprising opposing members shaped to press the ticket and material together in curvature, means for inserting a pin through the ticket and material transversely of the curvature so that the pin point stops at one margin of the ticket, means for feeding tickets into pinning position, and means movable relatively to said members for positioning said margin after the ticket reaches said position so that the point stops between the opposite outside faces of the ticket.

27. Apparatus for attaching a ticket to material, comprising opposing members shaped to press the ticket and material together in curvature, means for inserting a pin through the ticket and material transversely of the curvature so that the pin point stops at one margin of the ticket, means for feeding tickets into pinning position, and a pivoted member for positioning said margin after the ticket reaches said position so that the point stops between the opposite outside faces of the ticket.

28. Apparatus for attaching to material a ticket having an opening extending partially through a portion thereof, opposing members shaped to press the ticket and material together in curvature, means for inserting a pin through the ticket and material transversely of the curvature toward said portion, and means for holding said portion so that said opening is in the path of the pin point.

29. Apparatus for attaching a ticket to material, comprising relatively movable members for flexing the ticket and material, means for pinning the ticket and material together while so flexed, movable means acting on the margin of the ticket to cause the point of the pin to stop between the opposite outside faces of the ticket, means for moving said movable means into engagement with said margin, and means for subsequently moving one of said members toward the other to effect said flexing.

30. Apparatus for attaching to material a ticket having one opening extending partially through a portion thereof, opposing members shaped to press the ticket and material together in curvature, means for inserting a pin through the ticket and material transversely of the curvature toward said portion, means for holding said portion so that said opening is in the path of the pin point, means for first moving said movable member into engagement with said margin, and means for then moving one of said members toward the other to effect said flexing.

31. Apparatus for pinning a ticket to material, comprising opposing members shaped to press the ticket and material together in curvature, means including a spring for yieldingly forcing one member toward the other member, means for stopping the movable member at a predetermined position before it reaches the other member, thereby blocking the action of said spring, and means for then inserting a pin through the ticket and material transversely of said curvature.

32. Apparatus for pinning material, comprising relatively movable members for flexing the material transversely of a pin affixing path, means for feeding a pin strip transversely of said path until the foremost pin in the strip is in alignment with the path, and means for then driving said pin point foremost out of the strip along said path into the material transversely of its flexure.

33. In an apparatus for pinning tickets to material, the combination of means for feeding pins successively to position for attachment comprising means for pulling a pin strip toward said position with a step by step motion to advance a pin into attaching position at each step movement of the strip, and a stop in the path of the pins for engagement with the foremost pin when the latter reaches said position, means for moving the pin point foremost from said position into the material to be pinned, and means for guiding the pin in its movement into the material.

34. Apparatus for transferring straight pins from a pin strip in which the pins extend transversely to the longitudinal edges thereof, comprising a pin driver, means for feeding said strip toward a position in front of said driver with the edgewise dimension of the strip extending lengthwise of the driver, and guides engaging that portion of the strip engaged by the pins for positioning the strip in the path of the driver so that the pins may be successively pushed point foremost from the strip by the driver.

35. Apparatus for applying straight pins to material, comprising a crimping abutment, a plunger for moving the material against said abutment to crimp the material, the plunger having a pin groove, means for advancing a pin point foremost through the material along a line extending through said groove transversely of the crimp in the material, means for yieldingly advancing the plunger toward said abutment, and a stop limiting the advance of the plunger to a predetermined position short of said abutment.

CARL A. FLOOD.